(12) United States Patent
Tekgul et al.

(10) Patent No.: US 11,570,640 B2
(45) Date of Patent: Jan. 31, 2023

(54) TECHNIQUES FOR COORDINATING SCHEDULING WIRELESS COMMUNICATIONS USING A REPEATER

(71) Applicant: QUALCOMM Incorporated, San Diego, CA (US)

(72) Inventors: Ezgi Tekgul, Austin, TX (US); Navid Abedini, Somerset, NJ (US); Jianghong Luo, Skillman, NJ (US); Naeem Akl, Somerville, NJ (US); Raju Hormis, New York, NY (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 16/777,615

(22) Filed: Jan. 30, 2020

(65) Prior Publication Data

US 2021/0243622 A1    Aug. 5, 2021

(51) Int. Cl.
*H04W 24/08* (2009.01)
*H04B 7/15* (2006.01)
*H04W 24/10* (2009.01)

(52) U.S. Cl.
CPC .............. *H04W 24/08* (2013.01); *H04B 7/15* (2013.01); *H04W 24/10* (2013.01)

(58) Field of Classification Search
CPC ..... H04W 24/08; H04W 24/10; H04W 52/46; H04B 7/0632; H04B 7/14; H04B 7/15; H04B 17/00; H04B 17/101; H04B 17/309
See application file for complete search history.

(56) References Cited

U.S. PATENT DOCUMENTS 8,274,923 B2 * 9/2012 Shen ................ H04B 7/15542
455/7
8,532,566 B2 * 9/2013 Dussmann ......... H04B 7/15535
455/13.1

(Continued)

FOREIGN PATENT DOCUMENTS

WO    2011097817 A1    8/2011
WO    WO-2021007833 A1 * 1/2021    ............ H04W 72/08

OTHER PUBLICATIONS

ALCATEL-LUCENT: "System Design Frameworks to Support Type II Relay Operation in LTE-A", 3GPP Draft, 3GPP TSG RAN WG1 #58, R1-093355_TYPE2_RELAY_FRAMEWORK, 3rd Generation Partnership Project (3GPP), Mobile Competence Centre, 650, Route Des Lucioles, F-06921, Sophia-Antipolis Cedex, France, vol. RAN WG1, No. Shenzhen, China, Aug. 24, 2009-Aug. 28, 2009, Aug. 19, 2009 (Aug. 19, 2009), XP050597652, 11 pages, [retrieved on Aug. 19, 2009] p. 4.

(Continued)

*Primary Examiner* — Chi H Pham
*Assistant Examiner* — Weibin Huang
(74) *Attorney, Agent, or Firm* — Qualcomm Incorporated

(57) ABSTRACT

Aspects described herein relate to receiving, at a repeater and from a serving base station, one or more transmitted downlink beams, receiving, at the repeater and from a downstream node served by the serving base station, one or more transmitted uplink beams, and transmitting, to the serving base station, one or more parameters related to determining a channel quality metric using at least the one or more transmitted downlink beams and the one or more transmitted uplink beams.

30 Claims, 8 Drawing Sheets

(56) References Cited

U.S. PATENT DOCUMENTS

| | | | | |
|---|---|---|---|---|
| 8,600,294 B2* | 12/2013 | Yi | ................ | H04B 7/0619 |
| | | | | 455/7 |
| 8,917,649 B2* | 12/2014 | Sfar | ................ | H04L 5/0035 |
| | | | | 370/315 |
| 9,078,280 B2* | 7/2015 | Watanabe | ............ | H04W 52/244 |
| 9,083,421 B2* | 7/2015 | Coldrey | ............. | H04B 7/15557 |
| 9,154,250 B2* | 10/2015 | Manssour | ............. | H04W 88/04 |
| 9,276,661 B2* | 3/2016 | Sfar | ................ | H04L 67/303 |
| 9,461,800 B2* | 10/2016 | Vrzic | ................ | H04L 1/1867 |
| 10,743,203 B2* | 8/2020 | Guirguis | ............... | H04W 36/30 |
| 11,005,538 B2 | 5/2021 | Abedini et al. | | |
| 11,088,756 B2* | 8/2021 | Gharavi | ............... | H04B 7/0617 |
| 11,190,252 B2* | 11/2021 | Laghate | ............... | H04B 7/0632 |
| 2004/0192204 A1 | 9/2004 | Periyalwar et al. | | |
| 2009/0088164 A1* | 4/2009 | Shen | ................ | H04W 36/30 |
| | | | | 455/438 |
| 2018/0054742 A1* | 2/2018 | Kahtava | ................ | H04W 24/10 |
| 2018/0124718 A1* | 5/2018 | Ng | ............... | H04B 7/15 |
| 2019/0053249 A1* | 2/2019 | Zhang | ................ | H04B 7/155 |
| 2020/0112381 A1* | 4/2020 | Barnes | ............... | H04W 52/245 |
| 2020/0136733 A1* | 4/2020 | Hassan Hussein | ... | H04W 52/46 |
| 2020/0280127 A1 | 9/2020 | Hormis et al. | | |
| 2020/0403689 A1* | 12/2020 | Rofougaran | ........ | H04W 52/245 |
| 2021/0036764 A1 | 2/2021 | Li et al. | | |

OTHER PUBLICATIONS

International Search Report and Written Opinion—PCT/US2021/014652—ISA/EPO—dated Apr. 21, 2021.

* cited by examiner

TECHNIQUES FOR COORDINATING SCHEDULING WIRELESS COMMUNICATIONS USING A REPEATER

BACKGROUND

Aspects of the present disclosure relate generally to wireless communication systems, and more particularly, to wireless communications using repeaters between base stations and downstream nodes.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In wireless communication technologies such as 5G NR, nodes can beamform antenna resources to transmit and receive beams in certain spatial directions to improve hearability of the signals. In addition, repeaters can be used between nodes to receive and forward communications therebetween to further improve hearability of the signals and improve quality of communications between the nodes. There are multiple types of repeaters that can be used in wireless communications (e.g., in 5G NR), including: a first class of repeater that has no control from gNB, fixed beamforming, amplify-forward functionality, and full-duplex capability (referred to herein as a "class A repeater"); a second class of repeater that has some level of control from gNB (such as for beamforming and uplink/downlink direction), amplify-forward functionality, and full-duplex capability (referred to herein as a "class B repeater"); and a third class of repeater that can have more control from gNB, decode-forward functionality, and possibly half-duplex constraint (referred to herein as a "class C repeater," which may, e.g., include integrated access and backhaul nodes).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications is provided that includes receiving, at a repeater and from a serving base station, one or more transmitted downlink beams, receiving, at the repeater and from a downstream node served by the serving base station, one or more transmitted uplink beams, and transmitting, to the serving base station, one or more parameters related to determining a channel quality metric using at least the one or more transmitted downlink beams and the one or more transmitted uplink beams.

In another example, a method for wireless communication is provided that includes transmitting, by a serving base station, one or more transmitted downlink beams, receiving, from a repeater, one or more parameters related to determining a channel quality metric using at least one downlink beam of the one or more transmitted downlink beams and at least one uplink beam of one or more transmitted uplink beams transmitted by a downstream node that is served by the serving base station, determining, based at least in part on the one or more parameters, the channel quality metric, determining, based at least in part on the channel quality metric, a configuration for communicating with the downstream node, and communicating, based on the configuration, with the downstream node via the repeater In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
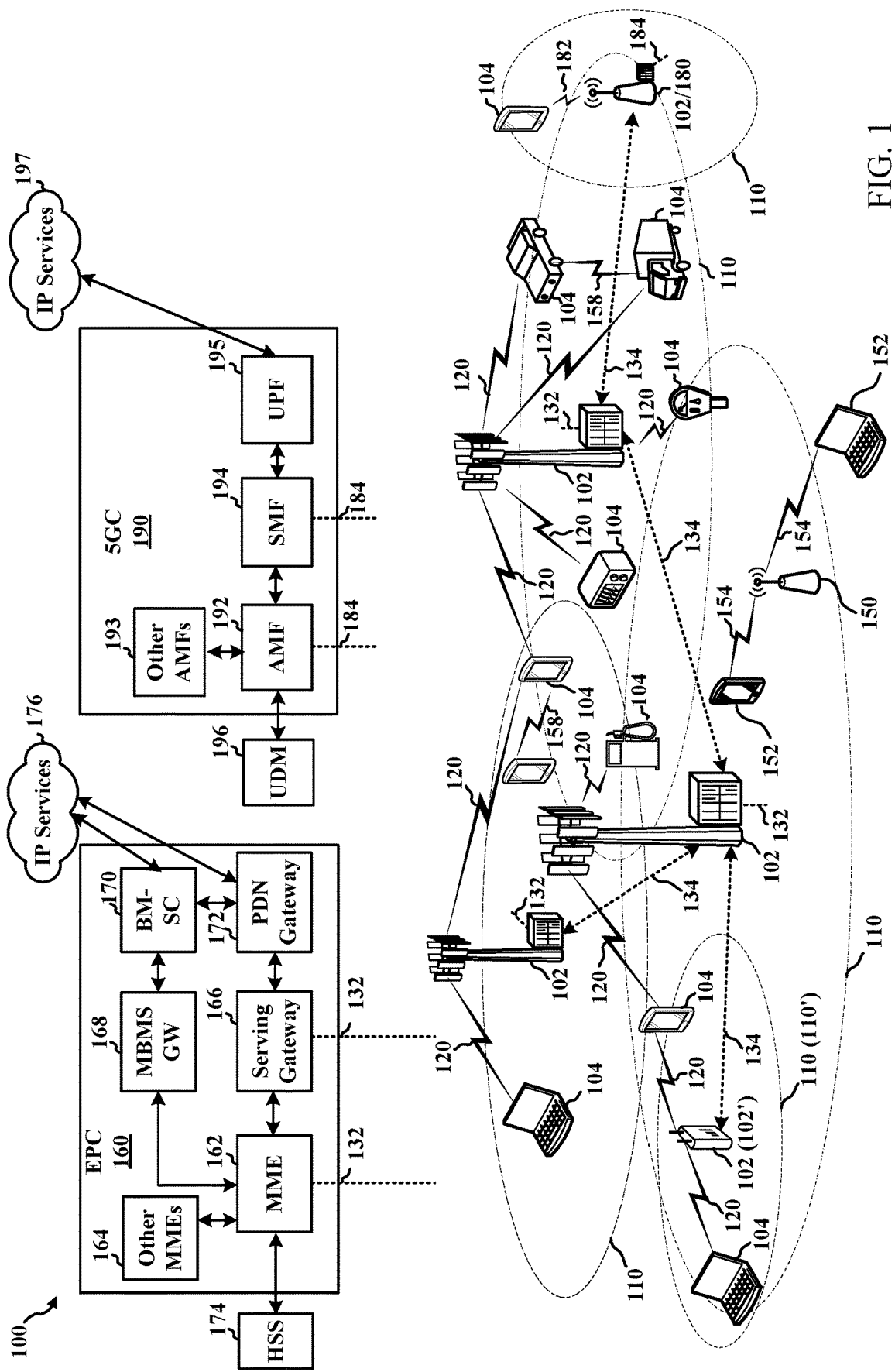
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring repeaters to report parameters relating to channel quality to upstream nodes, such as a base station, to enable the upstream node to schedule communications to downstream nodes based on the parameters. In some wireless communication technologies, such as fifth generation (5G) new radio (NR), an amplify-forward repeater can be used that can operate in full-duplex mode with some control from a base station or other upstream node (e.g., a class B repeater, an upstream integrated access and backhaul (IAB) node, etc.). An IAB node, for example, may be a node that has an access node (AN) function (AN-F) to facilitate transmitting downlink communications to, or receiving uplink communications from, one or more downstream nodes (e.g., one or more other IAB nodes, user equipment (UEs), repeaters, etc.) and a UE function (UE-F) to facilitate transmitting uplink communications to, or receiving downlink communications from, one or more upstream nodes (e.g., one or more other IAB nodes, repeaters, base stations, etc.).

In an example, an amplify-forward repeater can efficiently use available resources by operating in full duplex, which can potentially increase the system capacity, as compared to a decode-forward repeater, can experience or exhibit less forwarding latency (e.g., no extra latency for further intermediate frequency (IF)/baseband frequency (BB) processing, and no extra latency due to half-duplex operation), as compared to a decode-forward repeater, etc. An amplify-forward repeater, however, may also amplify unwanted signals (e.g., noise and interference) along with the wanted signal, which may result in reduction of overall effective signal-to-interference-and-noise ratio (SINR).

In an example, a class B repeater, which can also be referred to as a Layer 1 (L1) millimeter wave (MMW) repeater, can perform at least one or more of the following operations: receive analog signals on its receive (RX) antennas (e.g., based on some configured RX beamforming), amplify the power of the received analog signal, transmit the amplified signal from its transmit (TX) antennas (e.g., based on some configured TX beamforming), and/or communicate some control signals with an upstream node or a server (e.g., serving base station, donor node, control node, IAB node, etc.) via a control interface, where control interface can be out-of-band (e.g., using a different radio technology, such as Bluetooth, or different frequency, such as a frequency for long term evolution (LTE) narrowband (NB)-Internet of Things (IoT), etc.), or in-band (e.g., using a bandwidth part of the same carrier frequency that is used to receive and/or transmit the analog signals. When using a class B repeater, the effective signal-to-noise ratio (SNR) of a link between nodes that use the repeater can be a function of SNR on each link between each node and the repeater as well as certain internal radio frequency (RF) parameters of the repeater.

Aspects described herein relate to conveying, by a repeater, at least some of the parameters to a base station or other upstream node to facilitate determining a channel quality over the various links between the base station, repeater, and downstream node(s), and accordingly scheduling communications based on the determined channel quality. For example, the repeater can report the internal RF parameter values to the base station and/or can report channel quality metrics measured by the repeater on signals received from the base station and/or from the downstream node(s). The base station can accordingly receive the parameter values, determine the channel quality, and schedule one or more aspects of the communications based on the channel quality (e.g., a modulation and coding scheme (MCS), transmit or receive beam, transmit or receive power, etc.). Scheduling based on these parameters can be an improvement over the base station measuring values, at least because base station measurements may require downstream nodes to transmit/receive signals using all of multiple beams for each of multiple beams transmitted/received by the base station, whereas measurements at the repeater may only require the base station to transmit using each of its beams and the downstream nodes to transmit using each of their beams to perform all measurements. In addition, using the repeater to provide information may allow for more accurate consideration of the internal RF parameters of the repeater.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
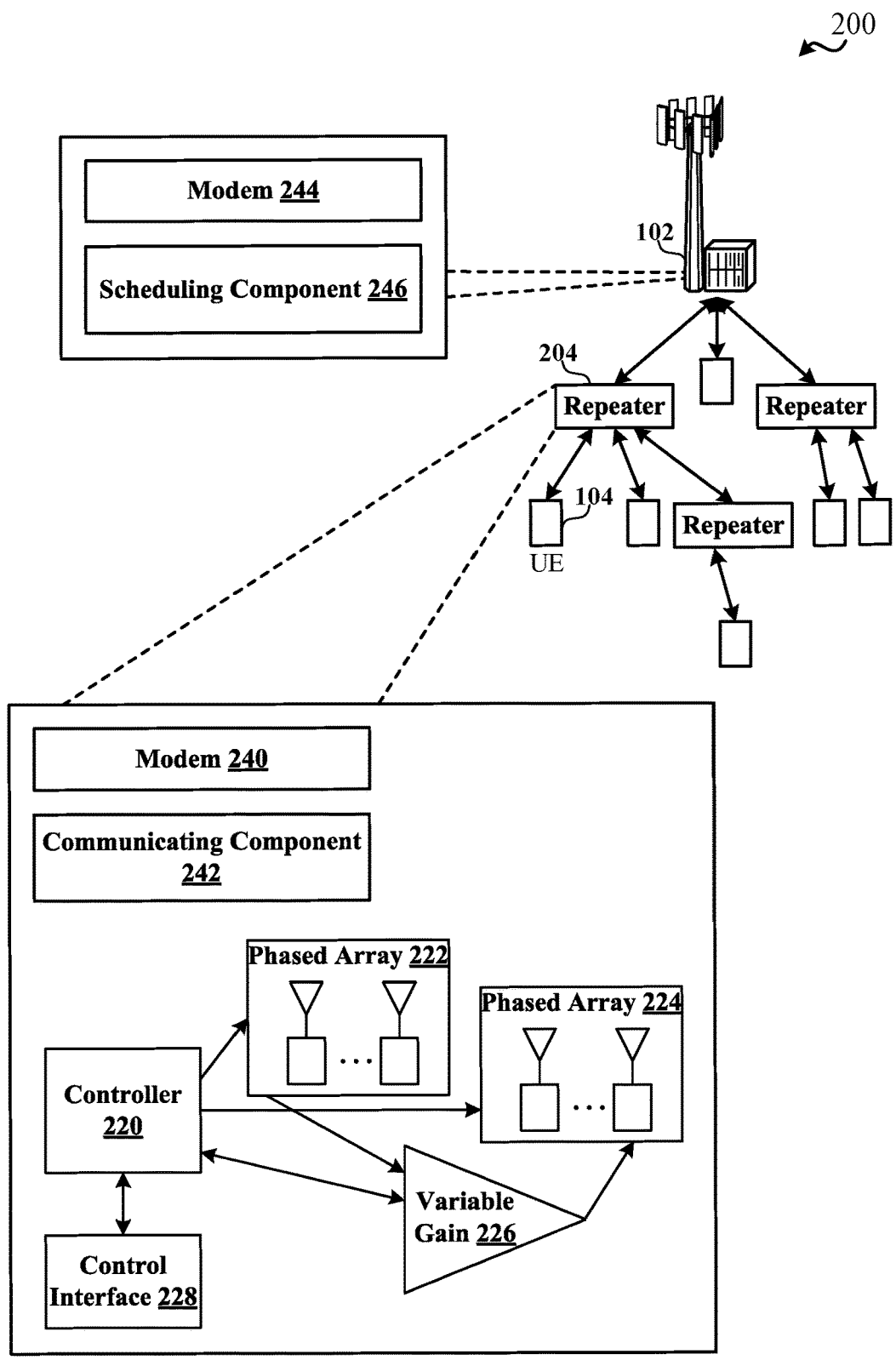
FIG. 2 illustrates an example of a wireless communication system that provides repeaters for facilitating communications between base stations and user equipment, in accordance with various aspects of the present disclosure.

In an example, base stations 102 can communicate with UEs 104 via one or more repeaters, as described further in reference to FIG. 2. Repeaters can include one or more of a class A repeater, a class B repeater, or a class C repeater, which can have varying levels of control by the base station 102 or other network components, as described.

Referring to FIG. 2, in accordance with various aspects described herein, an example of another wireless communication access network 200 that uses repeaters is depicted. The wireless communication access network 200 can include a base station 102 that can communicate with one or more UEs 104 and/or repeaters 204, where the repeaters can be positioned between the base station 102 (and/or one or more intermediate upstream repeaters) and a UE 104 (and/or one or more intermediate downstream repeaters). In an example, the repeaters 204 can be class B repeaters that allow some control by the base station 102 (e.g., for beamforming, uplink/downlink direction indication, etc.), and can provide an amplify-forward functionality for communications to/from a UE 104 and may operate in full duplex.

As described, in an example, a repeater 204 can include components for amplifying and forwarding transmissions and for transmitting control data to and/or receiving control data from other nodes, such as a base station 102. For example, repeater 204 can include a controller 220 that can control multiple phased arrays 222, 224 (e.g., arrays of antennas) and a variable gain function 226 for amplifying received signals. For example, repeater can receive signals from a base station 102, a UE 104, or another upstream or downstream node (e.g., another repeater) via phased array 222. The repeater 204 can amplify the received signals via variable gain 226 and can transmit the signals to a UE 104, base station 102, or another downstream or upstream node (e.g., another repeater) via phased array 224. In an example, repeater 204 can communicate in full duplex by concurrently receiving signals via phased array 222 and transmitting signals via phased array 224. In addition, control interface 228 can communicate control information to the base station 102 and/or a UE 104 (e.g., via a modem 240 and/or communicating component 242, as described further herein) and/or can receive control information from the base station 102 and/or the UE 104.

In a specific example, as described herein, communicating component 242 of a repeater can communicate one or more parameters to the base station 102 to facilitate estimating a channel quality metric and accordingly scheduling UEs or other downstream nodes that communicate with the repeater 204. For example, communicating component 242 can report, to the base station, one or more internal RF parameters, measurements of downlink beams transmitted by the base station 102 and/or uplink beams transmitted by the UE 104 or other downstream node, etc. Scheduling component 246 (e.g., via modem 244) can receive the one or more parameters from the repeater 204, and can accordingly estimate a channel quality metric and schedule one or more UEs for communications. For example, scheduling component 246 can determine and/or specify one or more parameters for the UEs to receive communications from the base station 102 and/or transmit communications to the base station 102, as described further herein.

Additionally, for example, the base station 102, repeater 204, and/or UE 104 can each be capable of beamforming antenna resources to transmit beams to, and/or receive beams from, one another. Beamforming antenna resources can include selectively applying power to the antenna resources to achieve a spatial directionality for the antenna resources, which can be used to transmit or receive signals. This can optimize communications between the nodes. In an example, nodes can provide feedback to one another regarding which of multiple possible beams should be used or are desired to be used. For example, the nodes can perform a beam management procedure (e.g., beam training) where multiple beams can be transmitted by one node (e.g., the base station 102) and measured by other nodes (e.g., the repeater 204 and/or UE 104) to determine which beam is optimal. The other nodes can indicated the desired beam to the one node, and the one node can transmit and/or receive based on the beam. The other nodes can receive and/or transmit based on a reciprocal beam.

In one example, in a downlink (DL) operation, repeater 204 can receive an analog signal from a base station 102 or an upstream node (e.g., an intermediate (higher-tier) repeater, an upstream IAB node, etc.) using an RX beam, then amplify and forward the signal on a TX beam towards the UE or another downstream node (e.g., a lower-tier repeater, a downstream IAB node, etc.). In an uplink (UL) operation, for example, repeater 204 can receive an analog signal from a UE 104 or a downstream repeater (e.g., an intermediate (lower-tier) repeater) on an RX beam, then amplify and forward the signal on a TX beam towards the base station 102 or another upstream repeater (e.g., a higher-tier repeater). The effective DL rate can be a function of the end-to-end SNR of the path from the base station 102 to the UE 104. The effective UL rate can be a function of the end-to-end SNR of the path from the UE to the base station. The end-to-end SNR along the path between a UE and a base station can in turn be a function of the SNR associated with each link along this path and one or more internal parameters at the UE and the intermediate repeaters, including noise figure at repeaters and UE, max power gain and/or max output power, switching latency at repeaters (e.g., to switch between transmitting and receiving), coupling effect at repeaters, etc.

Figure 3:
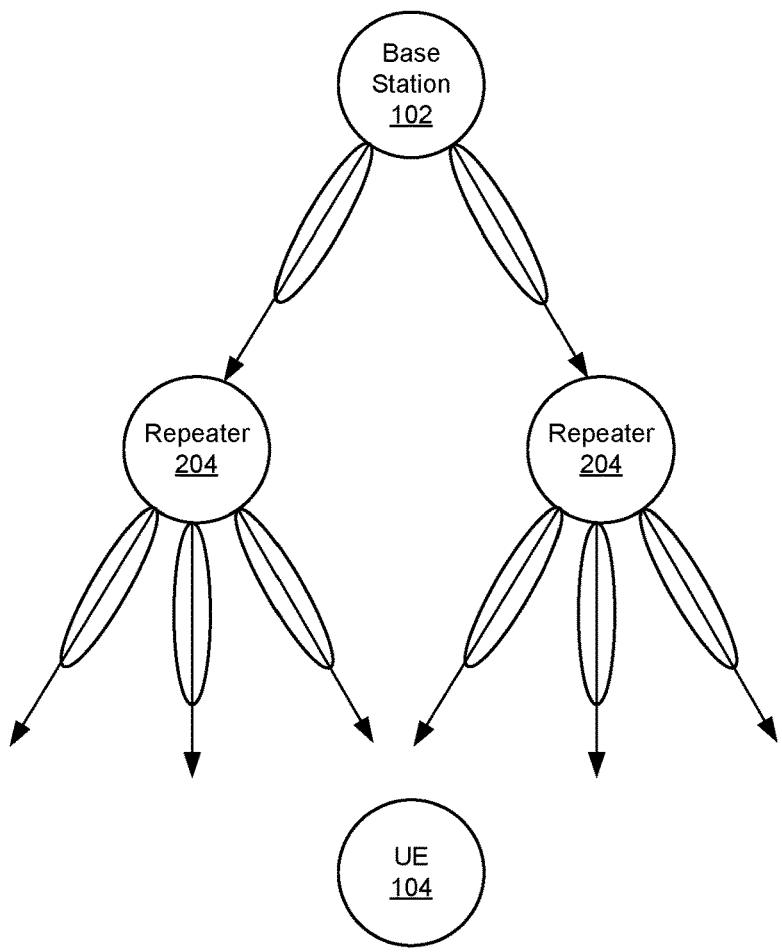
FIG. 3 illustrates an example of a wireless communication system where multiple nodes can beamform signals, in accordance with various aspects of the present disclosure.

FIG. 3 illustrates an example of a system 300 for beamforming communications between a base station, one or more repeaters, one or more UEs, etc. A base station 102 can communicate with one or more repeaters 204 using one or more beams (e.g., two beams are shown), which may be determined or selected from a set of multiple possible beams that the base station 102 can achieve by beamforming antenna resources, as described. Similarly, each repeater 204 can have multiple possible beams (e.g., three are shown for each repeater) that can be used in communicating with one or more UEs 104. The channel quality between the base station 102 and UE 104 can be a function of channel quality between the base station 102 and the repeater 204 (on a selected beam) and between the repeater 204 and the UE 104 (on a selected beam) as well as internal RF parameters of the repeater 204, as described. The base station 102 can schedule communication resources for the UE 104 based on at least one of the channel quality on one or more of the links and/or internal parameters of the repeater 204, one or more of which can be received from the repeater 204.

Where the base station 102 facilitates performing channel measurements without assistance from the repeater 204, for example, the base station 102 may need to transmit each of its beams to the repeater 204 while the UE 104 receives using each of its beams to receive the forwarded signal from the repeater 204 for each transmitted beam. In some examples described herein, however, the repeater 204 can assist the base station 102 by measuring channel quality of beams associated with the UE 104 and beams associated with the base station 102, and reporting the measurements to the base station 102, which can decrease the total number of beams to be transmitted to complete this procedure. For example, the repeater 204 can determine end-to-end SNR of communications between the base station 102 and the UE 104, via the repeater 204, by measuring SNR of the link between the base station 102 and repeater 204 (based on the corresponding beam), measuring SNR of the link between the UE 104 and the repeater 204 (based on the corresponding beam), incorporating internal parameters of the repeater 204, etc.

Figure 4:
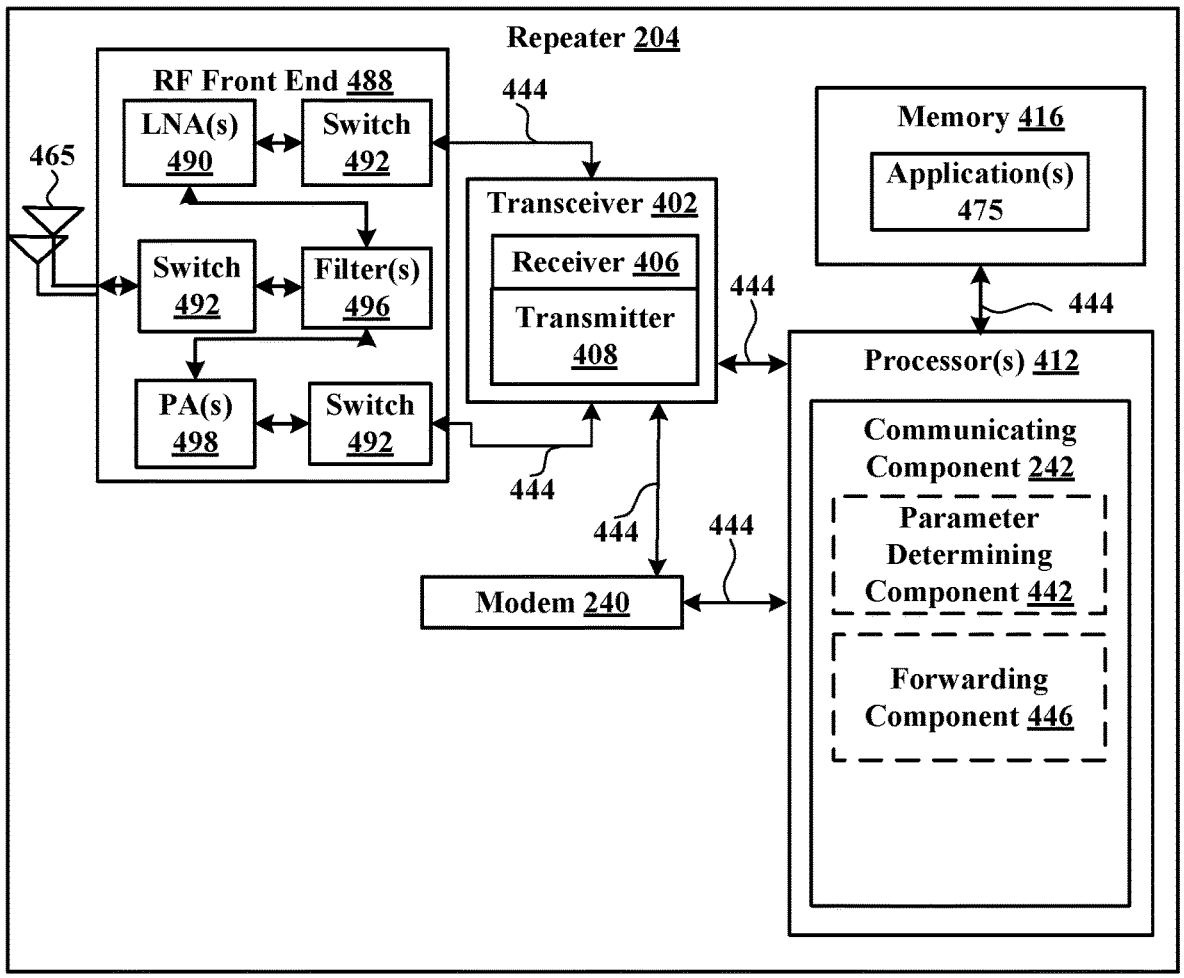
FIG. 4 is a block diagram illustrating an example of a repeater, in accordance with various aspects of the present disclosure.
Figure 5:
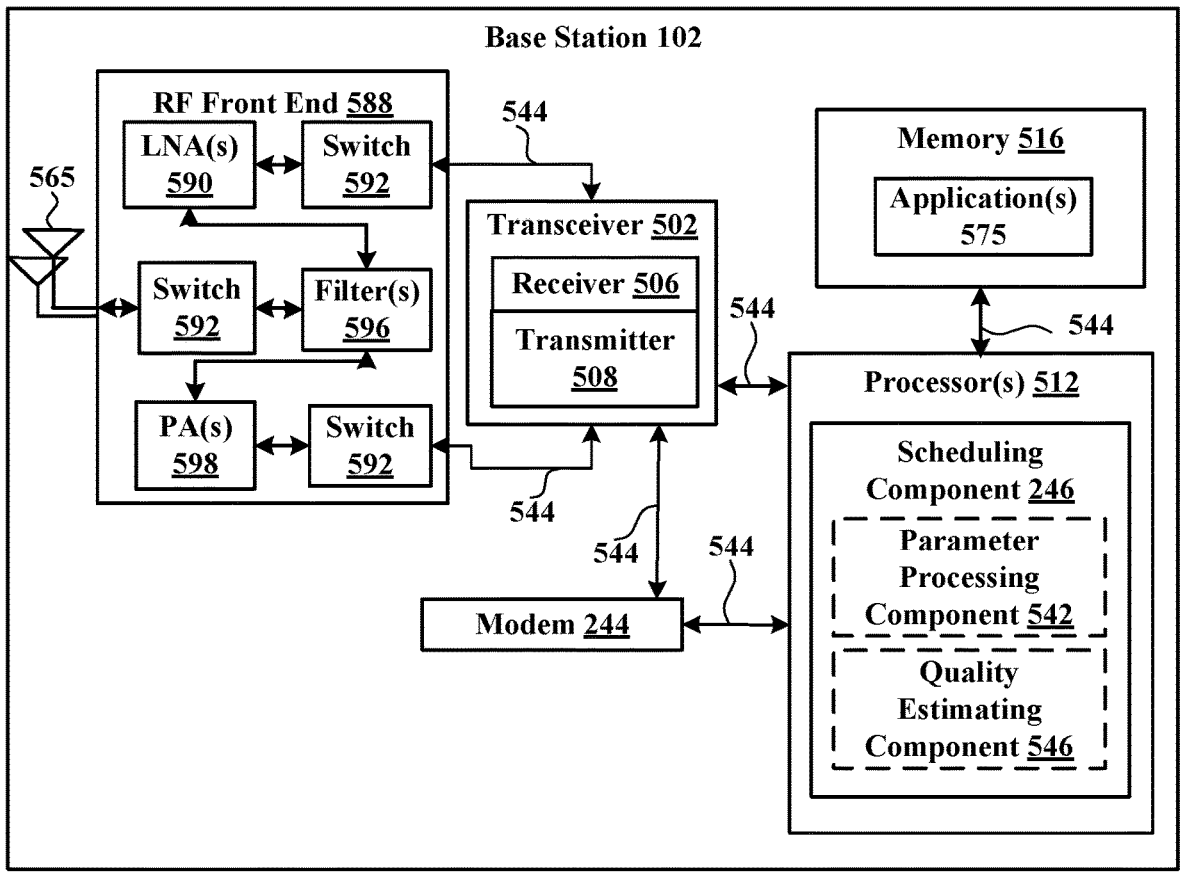
FIG. 5 is a block diagram illustrating an example of a base station, in accordance with various aspects of the present disclosure.
Figure 6:
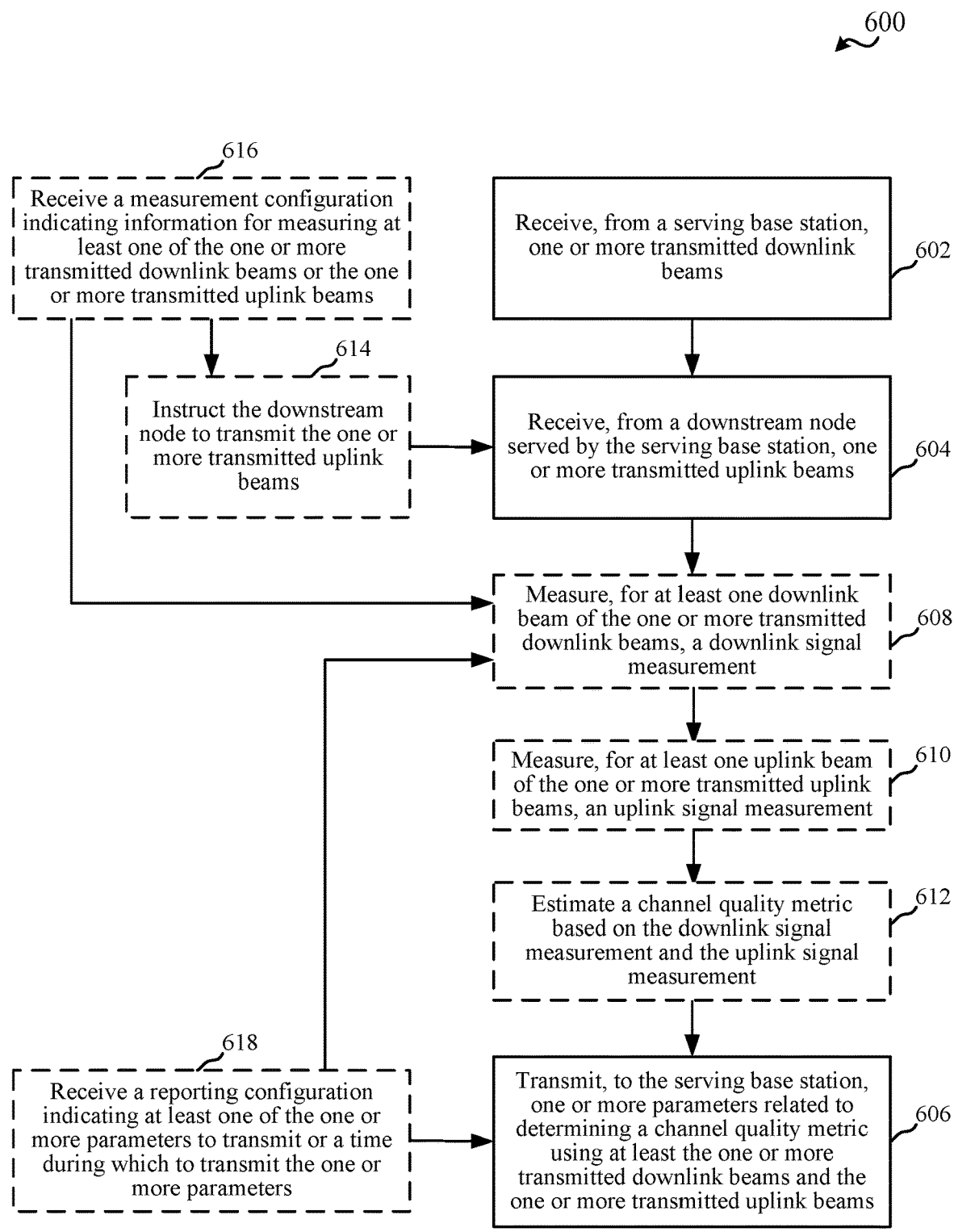
FIG. 6 is a flow chart illustrating an example of a method for providing information for determining a channel quality metric, in accordance with various aspects of the present disclosure.
Figure 7:
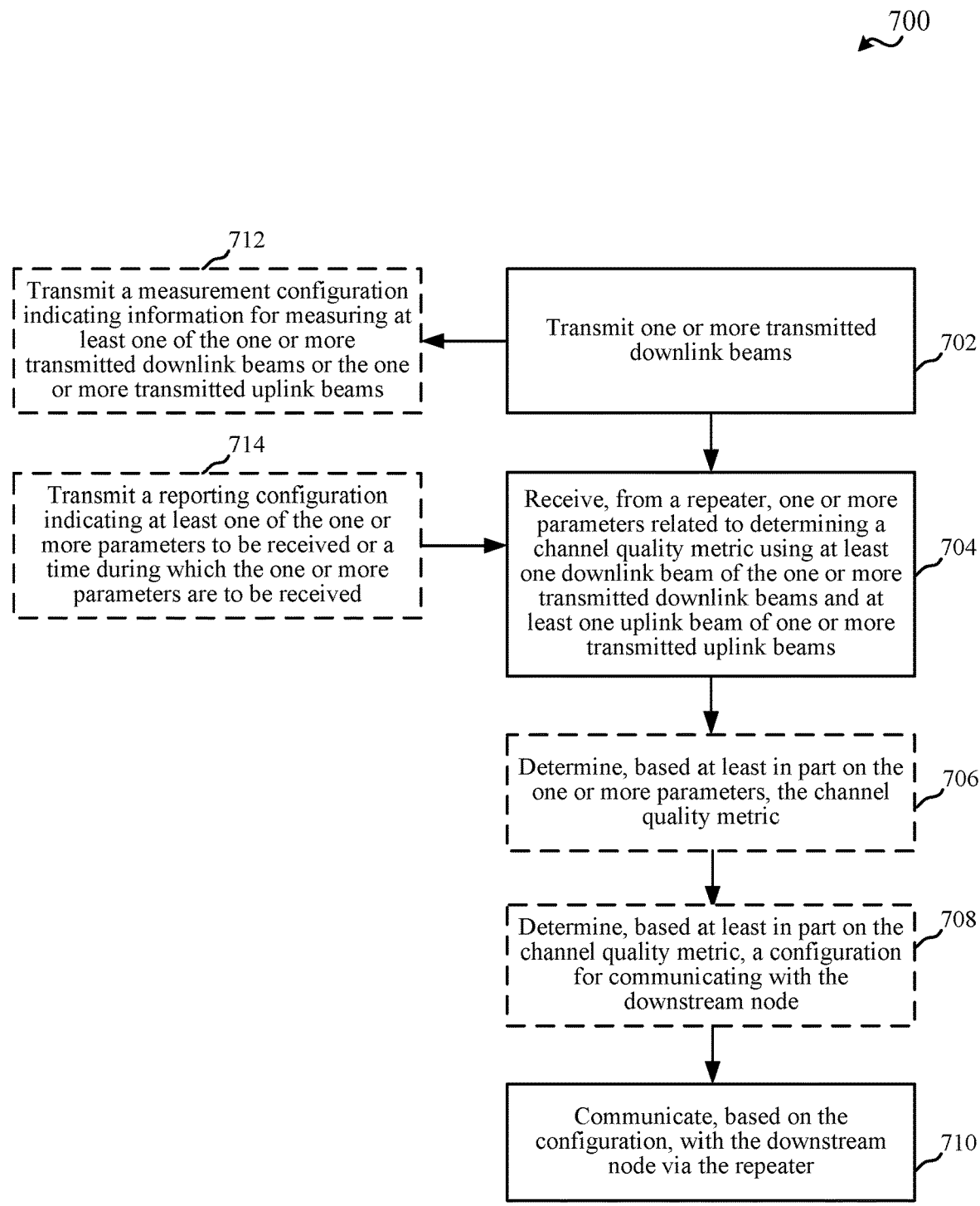
FIG. 7 is a flow chart illustrating an example of a method for scheduling communications based on a determined channel quality metric, in accordance with various aspects of the present disclosure.

Turning now to FIGS. 4-8, aspects are depicted with reference to one or more components and one or more methods that may perform the actions or operations described herein, where aspects in dashed line may be optional. Although the operations described below in FIG. 6-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 4, one example of an implementation of a repeater 204 may include a variety of components, some of which have already been described above and are described further herein, including components such as one or more processors 412 and memory 416 and transceiver 402 in communication via one or more buses 444, which may operate in conjunction with modem 240 and/or a communicating component 242 to report parameters to a base station to facilitate scheduling UEs or other downstream nodes and to facilitate communications between the base station and UEs or other downstream nodes. For example, communicating component 242 can optionally include a parameter determining component 442 for determining one or more parameters related to determining a channel quality metric, and/or a forwarding component 446 for forwarding communications received from the base station 102 to the UEs or other downstream nodes and/or vice versa.

In an aspect, the one or more processors 412 can include a modem 240 and/or can be part of the modem 240 that uses one or more modem processors. Thus, the various functions related to communicating component 242 may be included in modem 240 and/or processors 412 and, in an aspect, can be executed by a single processor, while in other aspects, different ones of the functions may be executed by a combination of two or more different processors. Moreover, the repeater 204 can include the other components described in reference to FIG. 2 for communicating (e.g., the controller 220, phased arrays 222, 224, variable gain function 226, etc., which may be part of RF front end 488, the control interface 228, which may communicate via communicating component 242 to report and/or receive certain information to/from a base station 102 or other node, etc., as described further herein). For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 240 associated with communicating component 242 may be performed by transceiver 402.

Also, memory 416 may be configured to store data used herein and/or local versions of applications 475 or communicating component 242 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining communicating component 242 and/or one or more of its subcomponents, and/or data associated therewith, when repeater 204 is operating at least one processor 412 to execute communicating component 242 and/or one or more of its subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a radio frequency (RF) receiver. In an aspect, receiver 406 may receive signals transmitted by an upstream node, a downstream node, etc. Additionally, receiver 406 may process such received signals, and also may obtain measurements of the signals, such as, but not limited to, Ec/Io, SNR, reference signal received power (RSRP), received signal strength indicator (RSSI), etc. Transmitter 408 may include hardware, firmware, and/or software code executable by a processor for transmitting data, the code comprising instructions and being stored in a memory (e.g., computer-readable medium). A suitable example of transmitter 408 may including, but is not limited to, an RF transmitter.

Moreover, in an aspect, repeater 204 may include RF front end 488, which may operate in communication with one or more antennas 465 and transceiver 402 for receiving and transmitting radio transmissions, for example, wireless communications transmitted by at least one base station 102 or wireless transmissions transmitted by a UE or other downstream node. RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and its specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488. In an aspect, transceiver 402 may be tuned to operate at specified frequencies such that repeater 204 can communicate with, for example, one or more upstream nodes (e.g., base stations 102, upstream IAB nodes, other repeaters, etc.) or one or more cells associated with one or more upstream nodes, one or more downstream nodes (e.g., UEs 104, downstream IAB nodes, other repeaters, etc.), and/or the like. In an aspect, for example, modem 240 can configure transceiver 402 to operate at a specified frequency and power level based on a configuration of the repeater 204 and the communication protocol used by modem 240.

In an aspect, modem 240 can be a multiband-multimode modem, which can process digital data and communicate with transceiver 402 such that the digital data is sent and received using transceiver 402. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of repeater 204 (e.g., RF front end 488, transceiver 402) to enable transmission and/or reception of signals from the network or UEs, upstream nodes or downstream nodes, etc. based on a specified modem configuration. In an aspect, the modem configuration can be based on the mode of the modem and the frequency band in use. In another aspect, the modem configuration can be based on configuration information associated with repeater 204 as provided by the network during cell selection and/or cell reselection or initial access.

In an aspect, the processor(s) 412 may correspond to one or more of the processors described in connection with the repeater 204 in FIG. 8. Similarly, the memory 416 may correspond to the memory described in connection with the repeater 204 in FIG. 8.

Referring to FIG. 5, one example of an implementation of a base station 102 may include a variety of components, some of which have already been described above, but including components such as one or more processors 512 and memory 516 and transceiver 502 in communication via one or more buses 544, which may operate in conjunction with modem 244 to provide backhaul access to a core network. In addition, the one or more processors 512 and memory 516 and transceiver 502 etc. may optionally operate with a scheduling component 246 for scheduling UEs or other downstream nodes for communication based on parameters received from a repeater. In an example, scheduling component 246 can optionally include a parameter processing component 542 for processing one or more parameters received from a repeater, and/or a quality estimating component 546 for estimating a channel quality metric based on the one or more parameters.

The transceiver 502, receiver 506, transmitter 508, one or more processors 512, memory 516, applications 575, buses 544, RF front end 588, LNAs 590, switches 592, filters 596, PAs 598, and one or more antennas 565 may be the same as or similar to the corresponding components of repeater 204, as described above, but configured or otherwise programmed for the base station 102 as opposed to repeater operations.

In an aspect, the processor(s) 512 may correspond to one or more of the processors described in connection with the base station in FIG. 8 to schedule UEs, as described. Similarly, the memory 516 may correspond to the memory described in connection with the base station in FIG. 8 to schedule UEs, as described.

FIG. 6 illustrates a flow chart of an example of a method 600 for reporting information related to determining a channel quality metric. In an example, a repeater 204 can perform one or more of the functions described in method 600 using one or more of the components described in FIGS. 2 and 4.

In method 600, at Block 602, one or more transmitted downlink beams can be received from a serving base station. In an aspect, communicating component 242, e.g., in conjunction with processor(s) 412, memory 416, transceiver 402, etc., can receive, from the serving base station, the one or more transmitted downlink beams. For example, the serving base station can be a base station (e.g., base station 102) serving one or more UEs (e.g., a UE 104) or other downstream nodes via repeater 204. For example, other downstream nodes may include one or more downstream repeaters that are downstream from repeater 204—e.g., closer to a UE. The one or more transmitted downlink beams can include a beam previously selected by the repeater 204 for communicating with the serving base station (e.g., indicated via a control interface 228). In another example, the one or more transmitted downlink beams can include multiple beams transmitted by the serving base station that are available for use in communicating with downstream devices, including repeater 204, other repeaters, and/or one or more UEs, etc., each of which can be beamformed in a different spatial direction. In an example, the repeater 204 can be a class B repeater that can amplify and forward the transmitted downlink beam(s) to one or more UEs or downstream nodes using one or more associated transmit beams.

In method 600, at Block 604, one or more transmitted uplink beams can be received from a downstream node served by the serving base station. In an aspect, communicating component 242, e.g., in conjunction with processor(s) 412, memory 416, transceiver 402, etc., can receive, from the downstream node served by the serving base station, the one or more transmitted uplink beams. For example, the downstream node may include a UE, another repeater, etc., and the one or more transmitted uplink beams can be associated with a different direction, as described. The one or more transmitted uplink beams can include a beam previously selected by the downstream node or the repeater 204 for communicating with the downstream node. In another example, the one or more transmitted uplink beams can include multiple beams transmitted by the repeater 204 or the downstream node that are available for use in communicating by the repeater or the downstream node, each of which can be beamformed in a different spatial direction. In an example, the repeater 204 can be a class B repeater that can amplify and forward the transmitted uplink beam(s) to one or more base stations or upstream nodes using one or more associated transmit beams.

In method 600, at Block 606, one or more parameters related to determining a channel quality metric using at least the one or more transmitted downlink beams and the one or more transmitted uplink beams can be transmitted to the serving base station. In an aspect, parameter determining component 442, e.g., in conjunction with processor(s) 412, memory 416, transceiver 402, communicating component 242, via control interface 228, etc., can transmit, to the serving base station (e.g., base station 102), the one or more parameters related to determining the channel quality metric using at least the one or more transmitted downlink beams and the one or more transmitted uplink beams. For example, the one or more parameters may include internal parameters of the repeater 204, such as RF parameters of the RF front end 488 of the repeater 204 or other parameters that can be used to determined channel quality. For example, the one or more parameters may include a noise figure (NF), a coupling metric, a maximum power output, a switching latency for switching a transceiver (e.g., transceiver 402) from transmit to receive or from receive to transmit, a switching latency for switching a transceiver between uplink and downlink communication direction, a latency to steer a transmit or receive beam at the transceiver, or a power gain of the radio at the repeater 204, and/or the like. For example, parameter determining component 442 can determine one or more of these parameters based on measuring related conditions of the repeater 204, querying a tracking component (not shown) that can track such parameters of the repeater 204 based on a history of communications, etc. In another example, the one or more parameters can include a measured or estimated channel quality metric over one or more of the link between the repeater 204 and the base station 102 (or other upstream node) or the link between the repeater 204 and the UE 104 (or other downstream node). In an example, these channel quality metrics can be measured based on the associated transmit beams and may be measured for one or more transmit beams (e.g., to facilitate determining a desirable combination of beams to use).

In method 600, optionally at Block 608, a downlink signal measurement can be measured for at least one downlink beam of the one or more transmitted downlink beams. In an aspect, parameter determining component 442, e.g., in conjunction with processor(s) 412, memory 416, transceiver 402, communicating component 242, etc., can measure, for at least one downlink beam of the one or more transmitted downlink beams, the downlink signal measurement. For example, parameter determining component 442 can measure the channel quality metric of the one or more transmitted downlink beams received at Block 602. For example, parameter determining component 442 can measure the channel quality metric of the transmitted downlink beam selected for communications between the serving base station of the UE and repeater 204. In an example, parameter determining component 442 can measure the channel quality metric of the one or more transmitted downlink beams as a raw measurement, such as SNR, SINR, RSRP, reference signal received quality (RSRQ), etc., or other measurements, such as channel quality indicator (CQI), precoding matric indicator (PMI), load indicator (LI), rank indicator (RI), etc. Parameter determining component 442 may, for example, report the measured channel quality metric to the serving base station as part of transmitting the one or more parameters to the serving base station (e.g., at Block 606). For example, parameter determining component 442 may report the measured channel quality metric for a beam selected for communications between the serving base station and the repeater 204 or for multiple beams transmitted by the serving base station as part of a beam management or training procedure.

In method 600, optionally at Block 610, an uplink signal measurement can be measured for at least one uplink beam of the one or more transmitted uplink beams. In an aspect, parameter determining component 442, e.g., in conjunction with processor(s) 412, memory 416, transceiver 402, communicating component 242, etc., can measure, for at least one uplink beam of the one or more transmitted uplink beams, the uplink signal measurement. For example, parameter determining component 442 can measure the channel quality metric of the one or more transmitted uplink beams received at Block 604. For example, parameter determining component 442 can measure the channel quality metric of the transmitted uplink beam selected for communications between the UE served by the serving base station and repeater 204. In an example, parameter determining component 442 can measure the channel quality metric of the one or more transmitted uplink beams as a raw measurement, such as SNR, SINR, RSRP, RSRQ, etc., or other measurements, such as CQI, PMI, LI, RI, etc. Parameter determining component 442 may, for example, report the measured channel quality metric to the serving base station as part of transmitting the one or more parameters to the serving base station (e.g., at Block 606). For example, parameter determining component 442 may report the measured channel quality metric for a beam selected for communications between the UE and the repeater 204 or for multiple beams transmitted by the UE as part of a beam management or training procedure, which repeater 204 and/or serving base station 102 may initiate for the UE.

In method 600, optionally at Block 612, a channel quality metric can be estimated based on the downlink signal measurement and the uplink signal measurement. In an aspect, parameter determining component 442, e.g., in conjunction with processor(s) 412, memory 416, transceiver 402, communicating component 242, etc., can estimate the channel quality metric based on the downlink signal measurement and the uplink signal measurement. For example, parameter determining component 442 can determine an end-to-end channel quality metric (e.g., end-to-end SNR) based on the channel quality metric measured for the at least one transmitted downlink beam (e.g., measured at Block 608) and the at least one transmitted uplink beam (e.g., measured at Block 610). In addition, in an example, parameter determining component 442 can estimate the channel quality metric based also on internal parameters of the repeater 204, as described. Thus, in an example, parameter determining component 442 can add the measured channel quality metrics and/or the internal parameters. In an example, parameter determining component 442 can transmit the estimated channel quality metric in transmitting the one or more parameters to the serving base station (e.g., at Block 606). In one example, parameter determining component 442 can estimate the channel quality metric for various pairs of uplink/downlink beams, and may report the multiple channel quality metrics to the serving base station and/or the UE for determining which beams to use.

In an example, in method 600, optionally at Block 614, the downstream node can be instructed to transmit the one or more transmitted uplink beams. In an aspect, communicating component 242, e.g., in conjunction with processor(s) 412, memory 416, transceiver 402, etc., can instruct the downstream node to transmit the one or more transmitted uplink beams. For example, communicating component 242 can transmit an instruction to the downstream node to transmit the one or more transmitted uplink beams as part of a beam management or training procedure (e.g., an instruction to transmit all available beams), to facilitate determining a desirable beam for communicating with the downstream node (e.g., a UE). In another example, communicating component 242 can transmit beams that the UE can evaluate and determine which beam to select for communicating with the repeater 204. The UE can indicate this beam to the repeater 204, and the repeater can receive the one or more transmitted uplink beams at Block 604 based on the selection. In one example, communicating component 242 can transmit the instruction as repeating the instruction from an upstream node (e.g., a serving) base station to be transmitted to the downstream node (e.g., the served UE). In yet another example, the upstream node can transmit the instruction directly to the downstream node without involving the repeater 204.

In an example, in method 600, optionally at Block 616, a measurement configuration indicating information for measuring at least one of the one or more transmitted downlink beams or the one or more transmitted uplink beams can be received. In an aspect, communicating component 242, e.g., in conjunction with processor(s) 412, memory 416, transceiver 402, etc., can receive the measurement configuration indicating information for measuring at least one of the one or more transmitted downlink beams or the one or more transmitted uplink beams. For example, communicating component 242 can receive the measurement configuration from the serving base station (e.g., over control interface 228), etc. The measurement configuration can indicate parameters for the repeater 204 to instruct the downstream node to transmit the one or more transmitted uplink beams (e.g., at Block 614). In another example, the measurement configuration can indicate parameters for the repeater to determine when and/or what metrics to measure of the one or more transmitted downlink beams and/or uplink beams, and parameter determining component 442 can accordingly measure the channel quality metric of the one or more transmitted downlink beams and/or uplink beams for reporting to the serving base station.

In an example, in method 600, optionally at Block 616, a reporting configuration, indicating at least one of the one or more parameters to transmit or a time during which to transmit the one or more parameters, can be received. In an aspect, communicating component 242, e.g., in conjunction with processor(s) 412, memory 416, transceiver 402, etc., can receive the reporting configuration indicating the at least one of the one or more parameters to transmit or the time during which to transmit the one or more parameters. For example, the reporting configuration can indicate whether the repeater 204 is to report internal parameters, estimated channel quality metrics of various links, a computed value based on the internal parameters, estimated channel qualities, etc., and/or the like. In addition, for example, the reporting configuration may indicate a time, periodicity, event or other trigger(s) for reporting the one or more parameters, and transmitting the one or more parameters at Block 606 may be based on the reporting configuration.

FIG. 7 illustrates a flow chart of an example of a method 700 for scheduling communications based on received information related to determining a channel quality metric. In an example, a base station 102 can perform one or more of the functions described in method 700 using one or more of the components described in FIGS. 2 and 5.

In method 700, at Block 702, one or more transmitted downlink beams can be transmitted. In an aspect, scheduling component 246, e.g., in conjunction with processor(s) 512, memory 516, transceiver 502, etc., can transmit the one or more downlink beams. For example, the base station 102 can be serving one or more UEs (e.g., a UE 104) or other downstream nodes via repeater 204. For example, other downstream nodes may include one or more downstream repeaters that are downstream from repeater 204—e.g., closer to a UE. The one or more transmitted downlink beams can include a beam previously selected by the repeater 204 for communicating with the serving base station 102 (e.g., indicated via a control interface 228). In another example, the one or more transmitted downlink beams can include multiple beams transmitted by the serving base station 102 that are available for use in communicating with downstream devices, including repeater 204, other repeaters, and/or one or more UEs, etc., each of which can be beamformed in a different spatial direction.

In method 700, at Block 704, one or more parameters related to determining a channel quality metric using at least one downlink beam of the one or more transmitted downlink beams and at least one uplink beams of one or more transmitted uplink beams can be received. In an aspect, parameter processing component 542, e.g., in conjunction with processor(s) 512, memory 516, transceiver 502, scheduling component 246, etc., can receive, from the repeater, the one or more parameters related to determining the channel quality metric using at least one downlink beam of the one or more transmitted downlink beams and at least one uplink beam of the one or more transmitted uplink beams. For example, the one or more parameters may include internal parameters of the repeater 204, channel quality metrics measured of the at least one uplink beam and/or the at least one downlink beam at the repeater 204 (e.g., raw measurements, such as SNR, SINR, RSRP, RSRQ, etc., or other measurements, such as CQI, PMI, LI, RI, etc.), an estimated channel quality metric computed based on channel quality metrics measured of the at least one uplink beam and/or the at least one downlink beam at the repeater 204, the internal parameters of the repeater 204, and/or the like, as described. Moreover, the one or more parameters can relate to selected beams and/or to multiple available beams to facilitate determining a desirable beam pair to use for communicating from the base station to the UE (via the repeater) and/or from the UE to the base station (via the repeater), etc.

In method 700, optionally at Block 706, the channel quality metric can be determined based at least in part on the one or more parameters. In an aspect, quality estimating component 546, e.g., in conjunction with processor(s) 512, memory 516, transceiver 502, scheduling component 246, etc., can determine, based at least in part on the one or more parameters, the channel quality metric. For example, quality estimating component 546 may determine the channel quality metric as received as one or more of the parameters. In another example, quality estimating component 546 can estimate the channel quality metric based on the one or more received parameters, such as based on received internal parameters of the repeater 204, which can be added to or otherwise used to modify measurements related to beams that can be measured by the base station 102, UE 104 served by the base station (and reported back through the repeater 204), etc. In yet another example, quality estimating component 546 can estimate the channel quality metric based on channel quality measurements for the at least one uplink beam and/or the at least one downlink beam, received from the repeater 204 (e.g., as measured by the repeater 204, as described above).

In method 700, optionally at Block 708, a configuration for communicating with the downstream node can be determined based at least in part on the channel quality metric. In an aspect, scheduling component 246, e.g., in conjunction with processor(s) 512, memory 516, transceiver 502, etc., can determine, based at least in part on the channel quality metric, the configuration for communicating with the downstream node. In one example, scheduling component 246 can determine resource for scheduling the downstream node (e.g., the UE) via the repeater 204 based on the channel quality metric. For example, based on the channel quality metric, scheduling component 246 can determine a transmit power, a receive power, a data rate, a modulation and coding scheme (MCS), an antenna rank, or resources for communicating with the downstream node. In another example, scheduling component 246 can determine, based on the channel quality metric, a transmit beam and/or a receive beam to use in communicating with the downstream node (e.g., the UE) via the repeater 204. As described, for example, the one or more parameters received from the repeater 204 may include channel metrics related to multiple beams and/or beam combinations (e.g., combinations of beams between the base station 102 and repeater 204 and between the repeater 204 and the downstream node).

For example, scheduling component 246 may accordingly select a transmit and/or receive beam based on determining which beams and/or beam combinations have desirable channel quality metrics. In an example, scheduling component 246 can select, based on channel quality metrics, whether to serve the downstream node (e.g., UE) directly or via the repeater 204. For example, where the base station 102 serves the downstream node (e.g., UE) directly (e.g., without employing a repeater), scheduling component 246 can select the transmit beam for transmitting downlink communications to the downstream node, the receive beam for the downstream node to use in receiving downlink communications from the base station 102, the receive beam for receiving uplink communications from the downstream node, and/or the transmit beam for the downstream node to use in transmitting uplink communications to the base station 102. Where scheduling component 246 selects beams for the downstream node, it can transmit information regarding the selected beams to the downstream node. For example, where the base station 102 serves the downstream node via a repeater 204, scheduling component 246 can also select the receive beam at the repeater 204 corresponding to the transmit beam at the base station 102 for receiving downlink communications transmitted by the base station 102 and can select the transmit beam at the repeater 204 corresponding to the receive beam at the downstream node for the repeater 204 to use in transmitting downlink communications from the base station 102 to the downstream node. Similarly, in this example where the base station 102 serves the downstream node via a repeater 204, scheduling component 246 can also select the transmit beam at the repeater 204 corresponding to the receive beam at the base station 102 for transmitting uplink communications to the base station 102 and can select the receive beam at the repeater 204 corresponding to the transmit beam at the downstream node for the repeater 204 to use in receiving uplink communications from the downstream node. Where scheduling component 246 selects beams for the repeater 204, it can transmit information regarding the selected beams to the repeater, as described herein.

In method 700, at Block 710, the downstream node can be communicated with via the repeater and based on the configuration. In an aspect, scheduling component 246, e.g., in conjunction with processor(s) 512, memory 516, transceiver 502, etc., can communicate, based on the configuration, with the downstream node via the repeater. For example, scheduling component 246 can schedule resources for communications and/or transmit (or configure transmission of) the communications based on the determined MCS, antenna rank, transmit power, receive power, data rate, etc. In another example, scheduling component 246 can communicate based on the determined transmit and/or receive beams, where determined based on parameters related from the repeater 204, as described above. In addition, as described above, scheduling component 246 can determine whether to communicate with the downstream node (e.g., UE 104) directly and/or via one or more repeaters 204, where the determination may be based on the channel quality metrics.

In an example, in method 700, optionally at Block 712, a measurement configuration indicating information for measuring at least one of the one or more transmitted downlink beams or the one or more transmitted uplink beams can be transmitted. In an aspect, scheduling component 246, e.g., in conjunction with processor(s) 512, memory 516, transceiver 502, etc., can transmit the measurement configuration indicating information for measuring at least one of the one or more transmitted downlink beams or the one or more transmitted uplink beams. For example, scheduling component 246 can transmit the measurement configuration to the repeater 204. The measurement configuration can indicate parameters for the repeater 204 to instruct the downstream node to transmit the one or more transmitted uplink beams, in one example. In another example, the measurement configuration can indicate parameters for the repeater to determine when and/or what metrics to measure of the one or more transmitted downlink beams and/or uplink beams.

In an example, in method 700, optionally at Block 714, a reporting configuration, indicating at least one of the one or more parameters to transmit or a time during which to transmit the one or more parameters, can be transmit. In an aspect, scheduling component 246, e.g., in conjunction with processor(s) 512, memory 516, transceiver 502, etc., can transmit the reporting configuration indicating the at least one of the one or more parameters to transmit or the time during which to transmit the one or more parameters. For example, the reporting configuration can indicate whether the repeater 204 is to report internal parameters, estimated channel quality metrics of various links, a computed value based on the internal parameters, estimated channel qualities, etc., and/or the like. In addition, for example, the reporting configuration may indicate a time, periodicity, event or other trigger(s) for reporting the one or more parameters, and receiving the one or more parameters at Block 704 may be based on the reporting configuration.

In the examples described herein, scheduling can be performed by the base station (e.g., gNB). A Class-B repeater can be used that can be layer 1 (L1)-repeaters where scheduling can be a layer 2 (L2)-functionality, and the Class-B repeater can support some level of control, as described. The scheduler (e.g., of the base station 102) can seek to optimize some objective over the served UEs (for e.g. geometric mean of UL/DL rates achieved at the UEs, QoS requirements of different UE services, etc.). In this example, the gNB can determine the end-to-end SNRs in order to determine what MCS to schedule on each child link. In an example, the base station and/or UE can perform the end-to-end measurements (e.g., where the UE can report measurements to the base station). End-to-end SNR can also be a function of internal parameters of the intermediate repeaters and the UE. Advantages of scheduling coordination in multi-hop communication, as described herein, includes intermediate repeaters supporting double communication with parent (BS/repeater) and child (repeater/UE) so can perform measurements on the two links. In addition, intermediate repeaters may have better estimate of its internal parameters (NF, coupling, power gain, etc.).

In addition, for example, the repeater may perform measurements on multiple parent and child beams, as described, and the measurement configuration can be determined by the control node/base station. The repeater may send to the base station raw measurement reports for the parent and/or child links per beam, estimate of the parent-repeater-child SNR per beam, raw internal parameters that affect the end-to-end SNR, and/or the like. The information sharing may be for both UL and DL scheduling. Based on the reported information, the base station can schedule an appropriate MCS or other parameters per UE, as described above.

Figure 8:
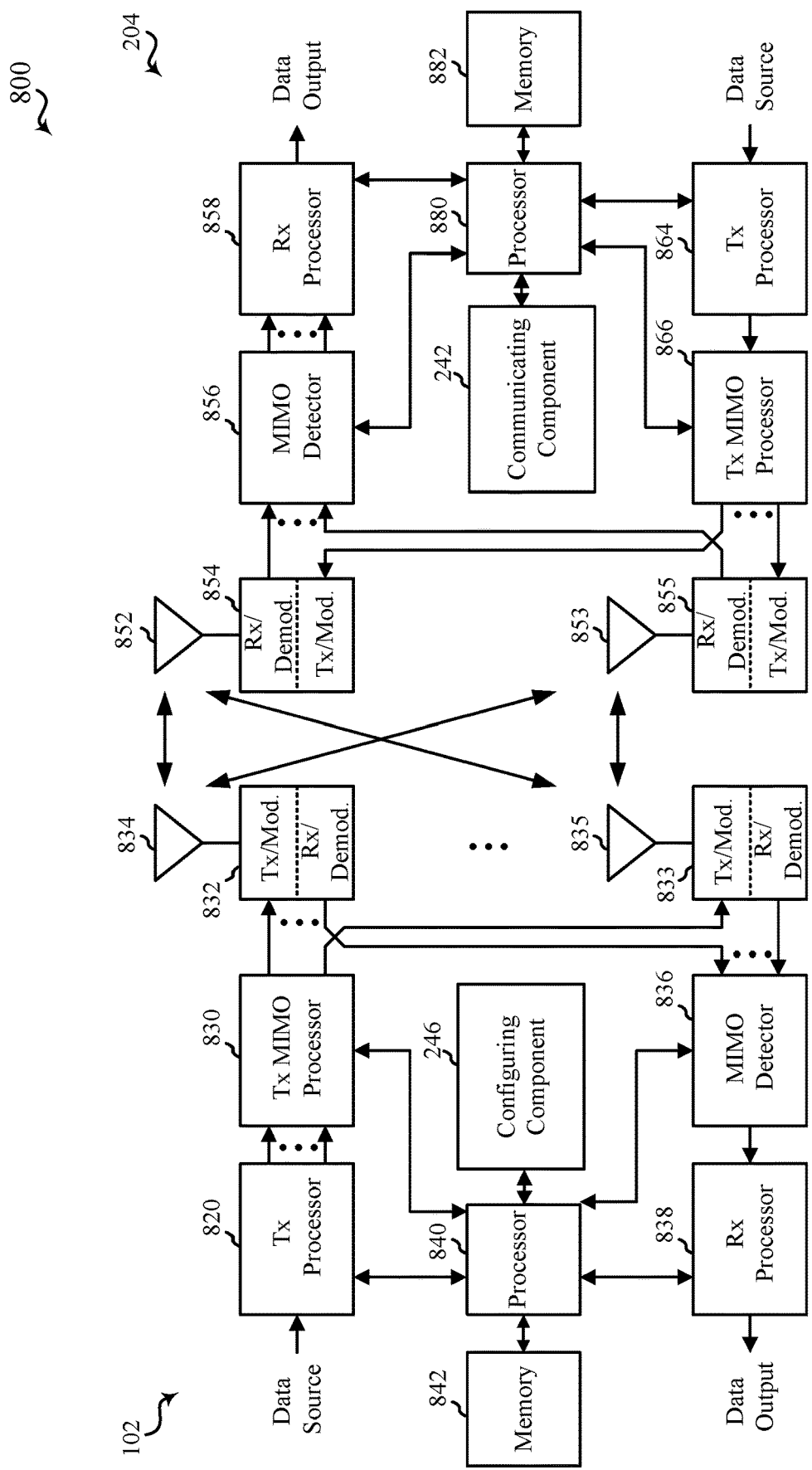
FIG. 8 is a block diagram illustrating an example of a MIMO communication system including a base station and a UE, in accordance with various aspects of the present disclosure.

FIG. 8 is a block diagram of a MIMO communication system 800 including a base station 102 and a repeater 204 (or a UE or other downstream node). The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the repeater 204 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the repeater 204 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The repeater 204 may be an example of aspects of the repeaters 204 described with reference to FIGS. 1-3, etc. At the repeater 204, the repeater antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the repeater 204 to a data output, and provide decoded control information to a processor 880, or memory 882.

The processor 880 may in some cases execute stored instructions to instantiate a communicating component 242 (see e.g., FIGS. 2 and 4) for reporting parameters and/or forwarding communications.

On the uplink (UL), at the repeater 204, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the repeater 204 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a scheduling component 246 (see e.g., FIGS. 2 and 5) for configuring a UE with communication resource based on information received from a repeater.

The components of the repeater 204 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 800.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
receiving, at a repeater and from a serving base station, one or more transmitted downlink beams;
receiving, at the repeater and from a downstream node served by the serving base station, one or more transmitted uplink beams; and
transmitting, to the serving base station, one or more parameters related to determining a channel quality metric using at least the one or more transmitted downlink beams and the one or more transmitted uplink beams.

2. The method of example 1, further comprising:
measuring, for at least one downlink beam of the one or more transmitted downlink beams, a downlink signal measurement; and
measuring, for at least one uplink beam of the one or more transmitted uplink beams, an uplink signal measurement,
wherein transmitting the one or more parameters comprises transmitting, to the serving base station, raw measurements of the downlink signal measurement and the uplink signal measurement.

3. The method of example 2, further comprising estimating, based on the downlink signal measurement and the uplink signal measurement, an estimated channel quality metric for a beam combination including the at least one downlink beam and the at least one uplink beam, wherein transmitting the one or more parameters comprises transmitting, to the serving base station, the estimated channel quality metric for the beam combination.

4. The method of any of examples 1 to 3, wherein the one or more parameters include radio frequency parameters of a radio at the repeater.

5. The method of example 4, wherein transmitting the one or more parameters comprises transmitting, to the serving base station, at least one of a noise figure (NF), a coupling metric, a maximum power output, a switching latency for switching a transceiver from transmit to receive or from receive to transmit, a switching latency for switching the transceiver between uplink and downlink communication direction, a latency to steer a transmit or receive beam at the transceiver, or a power gain of the radio at the repeater.

6. The method of any of examples 1 to 5, further comprising receiving, from the serving base station, a measurement configuration indicating information for measuring at least one of the one or more transmitted downlink beams or the one or more transmitted uplink beams.

7. The method of example 6, further comprising instructing, based on the measurement configuration, the downstream node to transmit the multiple transmitted uplink beams.

8. The method of any of examples 1 to 7, further comprising receiving, from the serving base station, a reporting configuration indicating at least one of the one or more parameters to transmit or a time during which to transmit the one or more parameters, wherein transmitting the one or more parameters is based on the reporting configuration.

9. A method for wireless communication, comprising:
transmitting, by a serving base station, one or more transmitted downlink beams;
receiving, from a repeater, one or more parameters related to determining a channel quality metric using at least one downlink beam of the one or more transmitted downlink beams and at least one uplink beam of one or more transmitted uplink beams transmitted by a downstream node that is served by the serving base station;
determining, based at least in part on the one or more parameters, the channel quality metric;
determining, based at least in part on the channel quality metric, a configuration for communicating with the downstream node; and
communicating, based on the configuration, with the downstream node via the repeater.

10. The method of example 9, wherein determining the configuration includes determining at least one of a transmit beam, a receive beam, a transmit power, a receive power, a data rate, a modulation and coding scheme (MCS), an antenna rank, or resources for communicating with the downstream node.

11. The method of any of examples 9 or 10, wherein the one or more parameters correspond to a downlink signal measurement of the at least one downlink beam and an uplink signal measurement of the at least one uplink beam.

12. The method of example 11, wherein the one or more parameters include raw measurements of the downlink signal measurement and the uplink signal measurement.

13. The method of example 12, wherein the one or more parameters include an estimated channel quality metric for a beam combination including the at least one downlink beam and the at least one uplink beam, wherein the estimated channel quality metric corresponds to the downlink signal measurement and the uplink signal measurement.

14. The method of any of examples 9 to 13, wherein the one or more parameters include radio frequency parameters of a radio at the repeater.

15. The method of example 14, wherein the one or more parameters include at least one of a noise figure (NF), a coupling metric, a maximum power output, a switching latency for switching a transceiver from transmit to receive or from receive to transmit, a switching latency for switching the transceiver between uplink and downlink communication direction, a latency to steer a transmit or receive beam at the transceiver, or a power gain of a radio at the repeater.

16. The method of any of examples 9 to 15, further comprising transmitting, to the repeater, a measurement configuration indicating information for measuring at least one of the multiple transmitted downlink beams or the one or more transmitted uplink beams.

17. The method of any of examples 9 to 16, further comprising transmitting, to the repeater, a reporting configuration indicating at least one of the one or more parameters to be received or a time during which the one or more parameters are to be received, wherein receiving the one or more parameters is based on the reporting configuration.

18. The method of any of examples 9 to 17, wherein determining the configuration include determining a modulation and coding scheme (MCS) for transmitting communications, and wherein transmitting the communications comprises scheduling the downstream node for uplink or downlink communications based on the MCS.

19. An apparatus for wireless communication, comprising:
  a transceiver;
  a memory configured to store instructions; and
  one or more processors communicatively coupled with the transceiver and the memory, wherein the one or more processors are configured to:
    receive, from a serving base station, one or more transmitted downlink beams;
    receive, from a downstream node served by the serving base station, one or more transmitted uplink beams; and
    transmit, to the serving base station, one or more parameters related to determining a channel quality metric using at least the one or more transmitted downlink beams and the one or more transmitted uplink beams.

20. The apparatus of example 19, wherein the one or more processors are further configured to:
  measure, for at least one downlink beam of the one or more transmitted downlink beams, a downlink signal measurement; and
  measure, for at least one uplink beam of the one or more transmitted uplink beams, an uplink signal measurement,
    wherein the one or more processors are configured to transmit the one or more parameters to include raw measurements of the downlink signal measurement and the uplink signal measurement.

21. The apparatus of example 20, wherein the one or more processors are further configured to estimate, based on the downlink signal measurement and the uplink signal measurement, an estimated channel quality metric for a beam combination including the at least one downlink beam and the at least one uplink beam, wherein the one or more processors are configured to transmit the one or more parameters to include the estimated channel quality metric for the beam combination.

22. The apparatus of any of examples 19 to 21, wherein the one or more parameters include radio frequency parameters of a radio at the repeater.

23. The apparatus of example 22, wherein the one or more processors are configured to transmit the one or more parameters to include at least one of a noise figure (NF), a coupling metric, a maximum power output, a switching latency for switching a transceiver from transmit to receive or receive to transmit, a switching latency for switching the transceiver between uplink and downlink communication direction, a latency to steer a transmit or receive beam at the transceiver, or a power gain of the radio at the repeater.

24. The apparatus of any of examples 19 to 23, wherein the one or more processors are further configured to receive, from the serving base station, a measurement configuration indicating information for measuring at least one of the one or more transmitted downlink beams or the one or more transmitted uplink beams.

25. The apparatus of example 24, wherein the one or more processors are further configured to instruct, based on the measurement configuration, the downstream node to transmit the multiple transmitted uplink beams.

26. The apparatus of any of examples 19 to 25, wherein the one or more processors are further configured to receive, from the serving base station, a reporting configuration indicating at least one of the one or more parameters to transmit or a time during which to transmit the one or more parameters, wherein the one or more processors are configured to transmit the one or more parameters based on the reporting configuration.

27. An apparatus for wireless communication, comprising:
  a transceiver;
  a memory configured to store instructions; and
  one or more processors communicatively coupled with the transceiver and the memory, wherein the one or more processors are configured to:
    transmit one or more transmitted downlink beams;
    receive, from a repeater, one or more parameters related to determining a channel quality metric using at least one downlink beam of the one or more transmitted downlink beams and at least one uplink beam of one or more transmitted uplink beams transmitted by a downstream node that is served by the serving base station;
    determine, based at least in part on the one or more parameters, the channel quality metric;
    determine, based at least in part on the channel quality metric, a configuration for communicating with the downstream node; and
    communicate, based on the configuration, with the downstream node via the repeater.

28. The apparatus of example 27, wherein the one or more processors are configured to determine the configuration based at least in part on determining at least one of a transmit beam, a receive beam, a transmit power, a receive power, a data rate, a modulation and coding scheme (MCS), an antenna rank, or resources for communicating with the downstream node.

29. The apparatus of any of examples 27 or 28, wherein the one or more parameters correspond to a downlink signal measurement of the at least one downlink beam and an uplink signal measurement of the at least one uplink beam.

30. The apparatus of example 29, wherein the one or more parameters include raw measurements of the downlink signal measurement and the uplink signal measurement.

31. An apparatus for wireless communication, comprising means for performing one or more of the methods of any of examples 1 to 18.

32. A computer-readable medium, comprising code executable by one or more processors for wireless communications, the code comprising code for performing one or more of the methods of any of examples 1 to 18.

What is claimed is:
1. A method for wireless communication, comprising:
  receiving, at a repeater and from a serving base station, one or more transmitted downlink beams;

receiving, at the repeater and from a downstream node served by the serving base station, one or more transmitted uplink beams; and transmitting, to the serving base station, one or more parameters related to determining a channel quality metric using at least a first metric of the one or more transmitted downlink beams, as measured at the repeater, and at least a second metric of the one or more transmitted uplink beams, as measured at the repeater.

2. The method of claim 1, further comprising:

measuring, for at least one downlink beam of the one or more transmitted downlink beams, a downlink signal measurement as the first metric; and measuring, for at least one uplink beam of the one or more transmitted uplink beams, an uplink signal measurement, as the second metric, wherein transmitting the one or more parameters comprises transmitting, to the serving base station, raw measurements of the downlink signal measurement and the uplink signal measurement.

3. The method of claim 2, further comprising estimating, based on the downlink signal measurement and the uplink signal measurement, an estimated channel quality metric for a beam combination including the at least one downlink beam and the at least one uplink beam, wherein transmitting the one or more parameters comprises transmitting, to the serving base station, the estimated channel quality metric for the beam combination.

4. The method of claim 1, wherein the one or more parameters include radio frequency parameters of a radio at the repeater.

5. The method of claim 4, wherein transmitting the one or more parameters comprises transmitting, to the serving base station, at least one of a noise figure (NF), a coupling metric, a maximum power output, a switching latency for switching a transceiver from transmit to receive or from receive to transmit, a switching latency for switching the transceiver between uplink and downlink communication direction, a latency to steer a transmit or receive beam at the transceiver, or a power gain of the radio at the repeater.

6. The method of claim 1, further comprising receiving, from the serving base station, a measurement configuration indicating information for measuring at least one of the one or more transmitted downlink beams or the one or more transmitted uplink beams.

7. The method of claim 6, further comprising instructing, based on the measurement configuration, the downstream node to transmit the one or more transmitted uplink beams.

8. The method of claim 1, further comprising receiving, from the serving base station, a reporting configuration indicating at least one of the one or more parameters to transmit or a time during which to transmit the one or more parameters, wherein transmitting the one or more parameters is based on the reporting configuration.

9. A method for wireless communication, comprising:

transmitting, by a serving base station, one or more transmitted downlink beams;

receiving, from a repeater, one or more parameters related to determining a channel quality metric using at least a first metric of at least one downlink beam of the one or more transmitted downlink beams, as measured at the repeater, and at least a second metric of at least one uplink beam of one or more transmitted uplink beams, as measured at the repeater and transmitted by a downstream node that is served by the serving base station;

and communicating, using a configuration that is based at least in part on the channel quality metric, with the downstream node via the repeater.

10. The method of claim 9, wherein the configuration is further based at least in part on at least one of a transmit beam, a receive beam, a transmit power, a receive power, a data rate, a modulation and coding scheme (MCS), an antenna rank, or resources for communicating with the downstream node.

11. The method of claim 9, wherein the one or more parameters correspond to a downlink signal measurement of the at least one downlink beam and an uplink signal measurement of the at least one uplink beam.

12. The method of claim 11, wherein the one or more parameters include raw measurements of the downlink signal measurement and the uplink signal measurement.

13. The method of claim 12, wherein the one or more parameters include an estimated channel quality metric for a beam combination including the at least one downlink beam and the at least one uplink beam, wherein the estimated channel quality metric corresponds to the downlink signal measurement and the uplink signal measurement.

14. The method of claim 9, wherein the one or more parameters include radio frequency parameters of a radio at the repeater.

15. The method of claim 14, wherein the one or more parameters include at least one of a noise figure (NF), a coupling metric, a maximum power output, a switching latency for switching a transceiver from transmit to receive or from receive to transmit, a switching latency for switching the transceiver between uplink and downlink communication direction, a latency to steer a transmit or receive beam at the transceiver, or a power gain of a radio at the repeater.

16. The method of claim 9, further comprising transmitting, to the repeater, a measurement configuration indicating information for measuring at least one of the one or more transmitted downlink beams or the one or more transmitted uplink beams.

17. The method of claim 9, further comprising transmitting, to the repeater, a reporting configuration indicating at least one of the one or more parameters to be received or a time during which the one or more parameters are to be received, wherein receiving the one or more parameters is based on the reporting configuration.

18. The method of claim 9, wherein the configuration is further based at least in part on a modulation and coding scheme (MCS) for transmitting communications, and wherein communicating with the downstream node includes scheduling the downstream node for uplink or downlink communications based on the MCS.

19. An apparatus for wireless communication, comprising:

a transceiver;

a memory configured to store instructions; and one or more processors communicatively coupled with the transceiver and the memory, wherein the one or more processors are configured to:

receive, from a serving base station, one or more transmitted downlink beams;

receive, from a downstream node served by the serving base station, one or more transmitted uplink beams; and transmit, to the serving base station, one or more parameters related to determining a channel quality metric using at least a first metric of the one or more transmitted downlink beams, as measured at the apparatus, and a second metric of the one or more transmitted uplink beams, as measured at the apparatus.

20. The apparatus of claim 19, wherein the one or more processors are further configured to:
measure, for at least one downlink beam of the one or more transmitted downlink beams, a downlink signal measurement as the first metric; and
measure, for at least one uplink beam of the one or more transmitted uplink beams, an uplink signal measurement as the second metric,
wherein the one or more processors are configured to transmit the one or more parameters to include raw measurements of the downlink signal measurement and the uplink signal measurement.

21. The apparatus of claim 20, wherein the one or more processors are further configured to estimate, based on the downlink signal measurement and the uplink signal measurement, an estimated channel quality metric for a beam combination including the at least one downlink beam and the at least one uplink beam, wherein the one or more processors are configured to transmit the one or more parameters to include the estimated channel quality metric for the beam combination.

22. The apparatus of claim 19, wherein the one or more parameters include radio frequency parameters of a radio at the apparatus.

23. The apparatus of claim 22, wherein the one or more processors are configured to transmit the one or more parameters to include at least one of a noise figure (NF), a coupling metric, a maximum power output, a switching latency for switching a transceiver from transmit to receive or from receive to transmit, a switching latency for switching the transceiver between uplink and downlink communication direction, a latency to steer a transmit or receive beam at the transceiver, or a power gain of the radio at the apparatus.

24. The apparatus of claim 19, wherein the one or more processors are further configured to receive, from the serving base station, a measurement configuration indicating information for measuring at least one of the one or more transmitted downlink beams or the one or more transmitted uplink beams.

25. The apparatus of claim 24, wherein the one or more processors are further configured to instruct, based on the measurement configuration, the downstream node to transmit the one or more transmitted uplink beams.

26. The apparatus of claim 19, wherein the one or more processors are further configured to receive, from the serving base station, a reporting configuration indicating at least one of the one or more parameters to transmit or a time during which to transmit the one or more parameters, wherein the one or more processors are configured to transmit the one or more parameters based on the reporting configuration.

27. An apparatus for wireless communication, comprising:
a transceiver;
a memory configured to store instructions; and
one or more processors communicatively coupled with the transceiver and the memory, wherein the one or more processors are configured to:
transmit one or more transmitted downlink beams;
receive, from a repeater, one or more parameters related to determining a channel quality metric using at least a first metric of at least one downlink beam of the one or more transmitted downlink beams, as measured at the repeater, and at least a second metric of at least one uplink beam of one or more transmitted uplink beams, as measured at the repeater and transmitted by a downstream node that is served by the apparatus;
and
communicate, using a configuration that is based at least in part on the channel quality metric, with the downstream node via the repeater.

28. The apparatus of claim 27, wherein the configuration is based at least in part on at least one of a transmit beam, a receive beam, a transmit power, a receive power, a data rate, a modulation and coding scheme (MCS), an antenna rank, or resources for communicating with the downstream node.

29. The apparatus of claim 27, wherein the one or more parameters correspond to a downlink signal measurement of the at least one downlink beam and an uplink signal measurement of the at least one uplink beam.

30. The apparatus of claim 29, wherein the one or more parameters include raw measurements of the downlink signal measurement and the uplink signal measurement.

* * * * *